United States Patent

[11] 3,563,494

[72] Inventor Paul K. Hokkinen
Toronto, Ontario, Canada

[21] Appl. No. 785,994
[22] Filed Dec. 23, 1968
[45] Patented Feb. 16, 1971

[73] Assignee Ferranti-Packard Limited
Toronto, Ontario, Canada

[54] MOVING TAPE STORAGE UNIT
6 Claims, 11 Drawing Figs.

[52] U.S. Cl. .......... 242/190; 242/75.3; 242/75.51
[51] Int. Cl. .......... B65h 59/38, G03b 1/00; G11b 15/43
[50] Field of Search .......... 242/75.3, 75.51, 189, 190

[56] References Cited

UNITED STATES PATENTS

| | | | |
|---|---|---|---|
| 2,318,316 | 5/1943 | Lawrence, Jr. | 242/75.3X |
| 2,700,544 | 1/1955 | Chambon | 242/75.3X |
| 2,969,200 | 1/1961 | Selsted | 242/189 |
| 3,092,296 | 6/1963 | Andrews | 242/189X |
| 3,232,546 | 2/1966 | Ferrand et al. | 242/189 |
| 3,275,258 | 9/1966 | Perez | 242/190 |

*Primary Examiner*—John Petrakes
*Attorney*—Westell & Hanley

ABSTRACT: A tape guide frame surrounds a tape supply or takeup spool and is biased in the tape unwinding direction for spool rotation. The frame is designed to store tape to be wound on or wound off the spool, in amounts of tape varying with the movement of the frame in accord with said bias. The movement of the frame may actuate controls for the spool drive to reduce the tape stored.

INVENTOR:

PAUL K. HOKKINEN

BY: Westell & Hanley

AGENTS FOR THE APPLICANT

PATENTED FEB 16 1971 3,563,494

INVENTOR:

PAUL K. HOKKINEN

BY: Westell & Hanley

AGENTS FOR THE APPLICANT

INVENTOR:

PAUL K. HOKKINEN

BY: Westell & Hanley

AGENTS FOR THE APPLICANT

INVENTOR:

PAUL K. HOKKINEN

BY: Westell & Hanley

MOVING TAPE STORAGE UNIT

This invention relates to a device for maintaining tape or other strip material taut between a tape winding or unwinding spool, on the one hand, and a tape handling device, on the other hand, where the spool and the tape-handling device have separate means for propelling the tape.

The invention will thus be useful with a tape reading wherein a tape reading and moving device is located between a pair of spools, one of which supplies tape to the tape reader and one of which takes up tape therefrom (and wherein the supply and takeup roles of the spools may or may not be interchangable). In such a tape reader, the reading device and the 'takeup' spool will have separate drives for the tape and thus means must be provided, to keep taut, the continually varying length of tape between the spool and the reader, caused by the varying propulsion rates of the separate propulsion means. Such means is really a variable length storage for moving tape and is sometimes referred to as 'compliance means' or, where appropriate, as a 'compliance arm.' If, as is common with such devices, separate propulsion means are also provided for the supply spool, a compliance means must also be provided to keep taut the ever-varying tape supply between the supply spool and the reader.

The sense of absolute velocities applied to the tape are described in relation to the spool concerned, i.e. the 'tape winding' and 'tape unwinding' directions identify those rotational directions of the spool concerned which increase and decrease, respectively, the amount of tape on the spool.

Since the invention is concerned with keeping tape taut between a tape processing device and a spool, it will be noted that what is important are the relative, and not the absolute, velocities provided to the tape by the device and spool and hence, where the tape processing device is spoken of as propelling the tape relatively faster than the spool in the winding direction, any of the following situations may exist:

*a.* both devices may be propelling tape in the winding direction with the tape processing device doing so faster;

*b.* the tape processing device may be stopped and the spool propelling tape in the tape unwinding direction;

*c.* the tape processing device may be propelling tape in the winding direction with the spool stationary or propelling tape in the tape unwinding direction. Conversely when the tape processing device is spoken of as propelling the tape relatively slower in the tape winding direction than the spool any one of the proper converses of the above relationships will be true.

Figure 10:
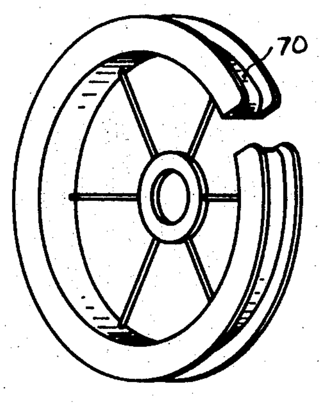
Figure 11:
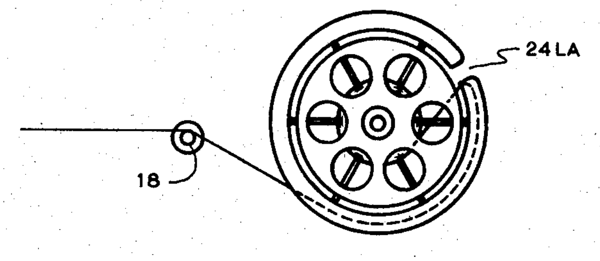

FIGS. 10—11 show alternative frame construction.

Figure 1:
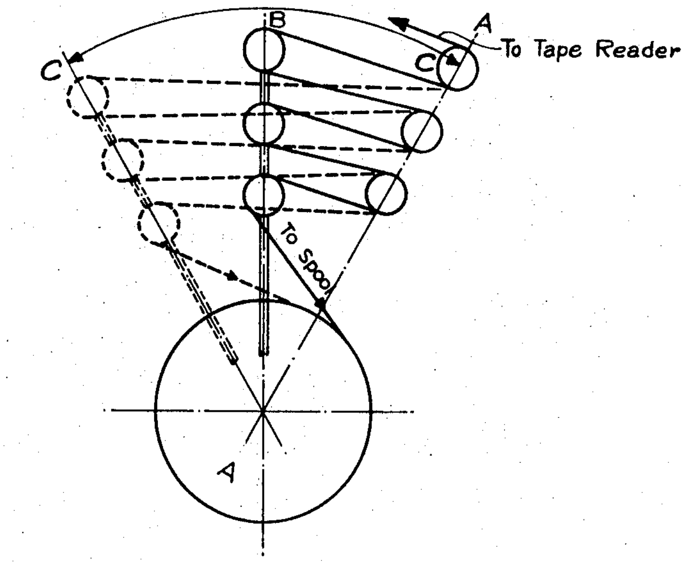
FIG. 1 shows the most common prior art method of taking up a varying length of excess tape.

As shown in FIG. 1, tape from the tape reader embodying the tape processing device is shown alternatively wound about rollers located on a fixed locus A–A and rollers mounted on an arm B movable through an angle C–C and from such rollers to a spool. (It will be obvious after consideration of the mechanism of operation that it will work equally well for tape feed in the opposite direction.) Means, not shown, bias the arm B (the 'compliance arm') toward the left in the drawing. When, with the device of FIG. 1, tape is being supplied from the tape reader at a rate faster than the spool is taking it up, then the arm B moves to the left under its bias, increasing the length held by the alternately wound rollers, until a predetermined limiting position is reached at such position means are provided to speed up or start the operation of the spool, designed to cause it to take up tape at a rate which is faster than the linear rate of supply. The reducing tape length between the reader and the spool causes the arm B to move to the right. When the arm, moving rightward, passes a predetermined limiting position, the arm is caused to actuate a switch reducing the rotational speed of, or stopping, the spool so that spool tape takeup is slower than it is being taken up by the device. Thus the arm oscillates between its two limiting positions (through the angle C–C,) and the spool drive is controlled as the slave of the tape reader drive. Similar slave control of the spool drive will take place where the spool is supplying tape toward the tape reader, such supply spool being provided with a compliance arm A–A operating as before but with the spool controlled by the position of the compliance arm to speed up or slow down as the tape stored on the arm becomes respectively shorter and longer than a median length.

It is convenient to mention here that as the arm reaches a limiting position, the control of the spool drive may be start-stop, or proportional, the proportional control being more conducive to smooth operation but more expensive to produce and more difficult to maintain.

The prior art system, as described above, has disadvantages, in that either a very few rollers are provided low tape storage, or a larger number of rollers are provided, increasing the tape storage. The use of a large number of rollers, however involves the lengthening of the arm B–B (known as the 'compliance arm'). This therefore requires a larger space for the tape reader console, or assembly, which is a major disadvantage, since the compactness of such units is of major importance. Moreover the increased length of the arm B–B increases the inertia of the system, increasing tape tension and the likelihood of breakage.

As shown in FIGS. 2—6, the invention is shown as applied to a console 10 having spools 12 and 14, and, on the tape path between them a tape processing device 16. Not shown, since they are well-known to those skilled in the art are the separate tape propulsion means for the spools and at the tape processing device 16.

The device 16 shown is a tape reader with its own intermittent tape propulsion means and is well-known to those skilled in the art.

The invention is used with a tape guide member 18 arranged to contact and guide tape T extending between said tape handling device 16 and each of said spools, said tape guide member 18 being arranged to be contacted by the tape guided thereby on the tape winding side of member 18 relative to the rotation direction of the nearer spool. The tape guide member 18 may be a post with side guide edges for the tape or if desired, a roller with similar edges.

A frame 20 is rotatably mounted on the shaft 22 of each spool for movement of posts 24 about the periphery on an arcuate locus about the periphery of said spool and between post 18 and such periphery. Posts 24 preferably carry side guides 26 to maintain tape thereon. Tape has been maintained on such posts without such side guides, however the side guides 26 are preferred. The frame 20 is arranged to define a tape guide path approximately conforming to said arcuate locus and spaced from tape wound on the spool 14, said tape guide path ending in a tape guide surface 28 facing in the tape unwinding direction.

In the preferred embodiment the frame 20 comprises a plurality of posts 24 located and spaced to guide a tape supported on the radially outward side of posts 24, and extending along a path comprising a series of chords spaced outside the maximum diameter which would be achieved by tape wound on the spool 14.

One of the posts 24L is selected as the lead post in the tape unwinding direction so that tape extending along such path extends over the radially outer side of the lead post 24L, about the tape unwinding side thereof (which side embodies the 'tape guide surface' previously mentioned) and onto the spool 14. (By 'extends' no direction of motion is implied). The posts 24 and the lead post 24L may be merely made smooth for easy sliding of the tape thereover or may be provided with rollers. As shown, the posts 24, other than the lead post 24L are static elements with raised surface 26 at each end while the lead post is provided with a tape guide spool 29.

The guide path (around posts 24) and guide surface (on guide spool 29), as above defined, are designed to guide tape extending between said tape guide member 18, over a variable extent of said path, about the tape unwinding side of said spool 29 and onto spool 14.

The frame 20 is mounted for rotation coaxially with the spool shaft 22. ACcordingly in FIG. 6 the frame is shown mounted on a hollow hub 30 for rotation therewith which has a large central bore 32. The console which is not shown in detail is provided with a central shaft 22 for mounting and driving the spool (with the spool mounting means not shown in detail as these are well known) and a stationary boss 36 surrounding the inner portion of the shaft 22 dimensioned to rotatably slidably receive the frame hub 30. A coil spring 38 attached to the console at peg 40 and to the frame at groove 42 is arranged to bias the frame in the spool unwinding direction. Thus it will be seen that with the frame in position the tape is connected; from the tape processing device; about the guide posts 18; over part of the frame in the tape unwinding direction to the tape guide surface 28 or roller 29; and then to the spool.

Figure 8:
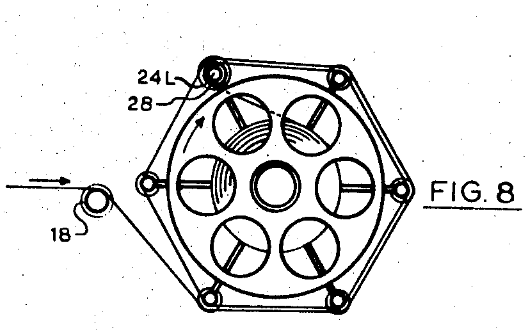
FIG. 8 shows an alternative to the device in FIG. 4.

Thus it will be seen that the frame 20 will move under the bias of spring 38 in the tape unwinding direction to an orientation where the tape is taut, so that the excess tape is stored on the outside of the frame. It will be noted that the frame may rotate sufficiently far in the tape unwinding direction to store more than one layer of tape on the frame (as indicated in FIG. 8, the alternative embodiment). There is a slight differential in tape speed between overlapping layers in the embodiment of FIG. 8 but this does not interfere with tape feed, although it will be realized that, for any frame and type of tape material there is a limit to the amount of tape layers which can operate in this way before frictional effects interfere with tape movement. Thus it will be seen that independent of the direction of tape propulsion provided by a spool 14 and the tape reader 16, and up to a relatively high limit, the tape therebetween will be stored on the frame.

Means are provided to control the amount of tape propulsion supplied by the spool 14 to that which will allow the tape stored to remain within the storage limits of the frame. The frame orientation as determined by the amount of tape stored under the bias of spring 38 is used to control the operation of the spool drives so that the spool drives will be 'slaves' to the drive supplied by the tape reader, so that the tape propulsion supplied by a spool 14 corresponds to the requirements of the tape reader propulsion speed. The control means used will vary with the tape propulsion supplied by the tape reader and the spools. However the described control assumes the commonest tape propulsion arrangement, i.e., where the tape drive is intermittent but over any material interval provides an average tape propulsion speed, in either direction smaller than the tape speed provided by the spool motor in either direction.

Figure 7:
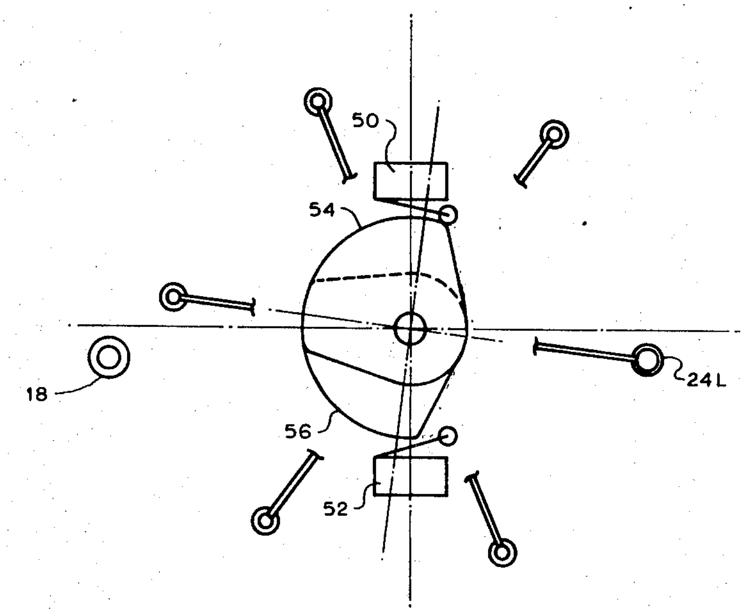
FIG. 7 shows the means for control actuation by the frame.
Figure 3:
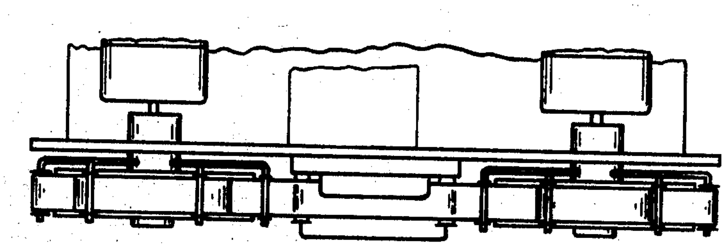
FIG. 3 shows a top view of the device of FIG. 2.
Figure 2:
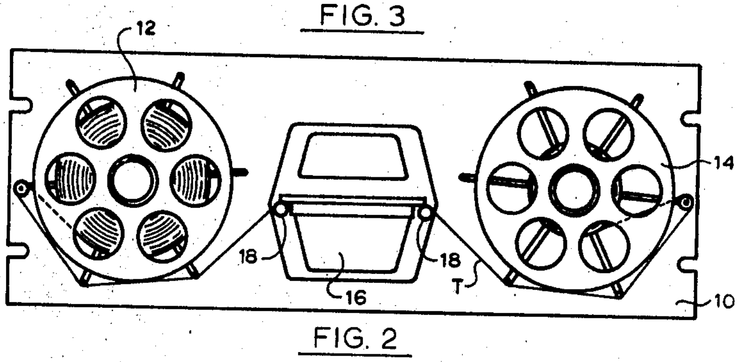
FIG. 2 shows a front view of a tape reader console with two spools and a tape reader; and utilizing the invention.
Figure 4:
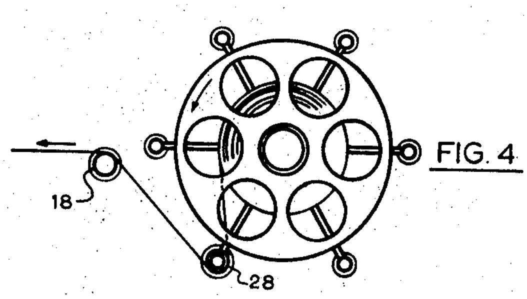
FIG. 4 and 5 show movement of the compliance frame shown in FIG. 2.
Figure 5:
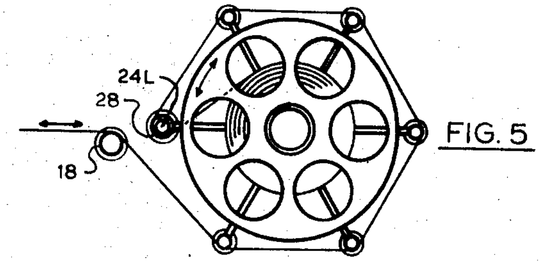
Figure 6:
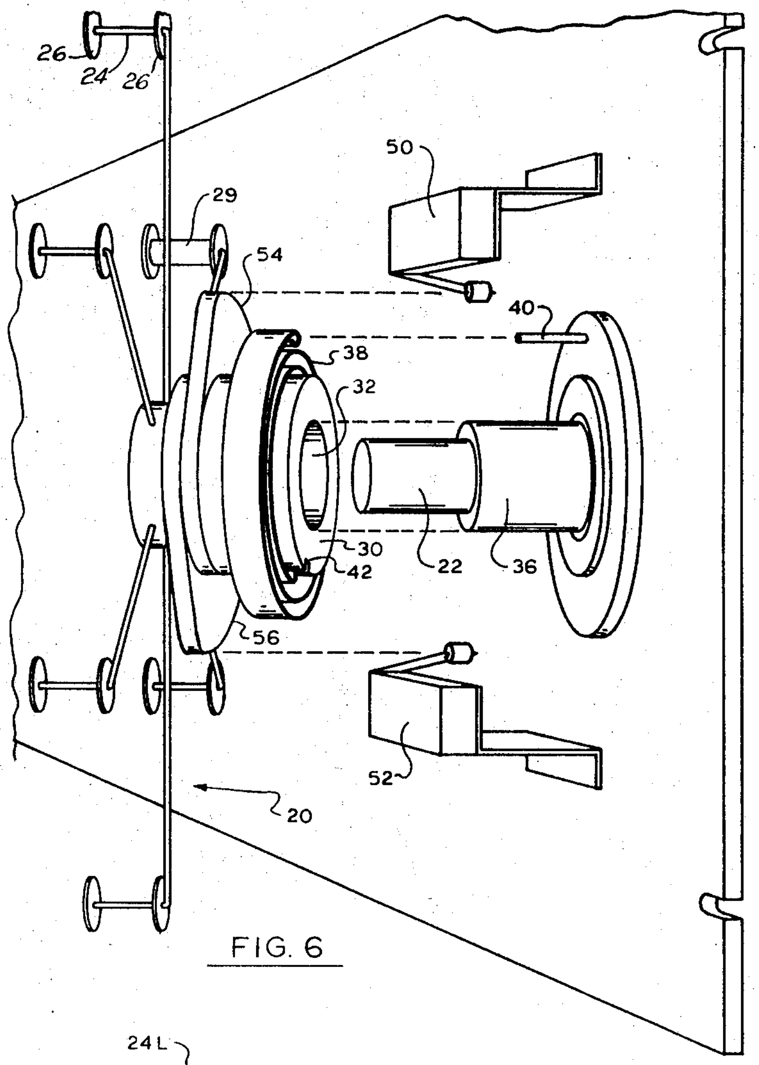
FIG. 6 shows the frame mounting.

In one form of the invention, the range of movement of the frame is less than 360° as illustrated in FIGS. 6 and 7. Here the control actuation is shown as two microswitches 50 and 52 axially displaced from one another and disposed to be contacted by correspondingly axially displaced cams 54 and 56. The cams 54 and 56 are made rotatable with the frame 20 and are arranged so that, as shown in FIG. 7, they will respectively contact switches 50 and 52 at locations of lead guide surface 24L about 5° on each side of a position about 180° removed in the spool unwinding sense from the line joining guide post 18 to the center of the spool 14. As will be seen from FIG. 7 neither micro switch is depressed with lead guide surface 24L at this point. The microswitches 50 and 52 are designed to actuate the motor in the manner that, when neither microswitch is depressed, the spool driving motor is inoperative. When the frame rotates in the unwinding direction so that microswitch 52 is depressed, the control circuit operated by the microswitch (not shown) will be connected so that the depression of that microswitch 52 connects the motor to operate the spool in the spool winding direction. The consequent reduction in stored tape will move the frame 20 against the spring 38 bias in the spool winding direction. The motor will continue until the cam 56 releases microswitch 52. The motor will then shut off and the movement of the frame in the spool winding direction will stop; unless the inertia of the motor and the frame are sufficient to cause cam 54 to depress switch 50 connected to cause the motor to rotate the spool in the spool unwinding direction to again return the frame and cam to a position where the motor cuts off and the frame is again within the angular range where neither microswitch is depressed. It will be seen that the operation described so far is independent of the direction of tape propulsion by the tape reader. For tape reader propulsion in the tape unwinding direction (relative to the spool shown) the state of the spool motor, controlled by the frame position, cams and microswitches will alternate between spool motor off and spool motor drive in the tape unwinding direction. For high inertial systems, as previously explained, these states may be sometimes interspersed with short interval rotation of the spool in the tape winding direction. Conversely, for tape reader propulsion in the tape winding direction (relative to the spool shown), the state of the spool motor, controlled by the frame position will alternate between spool motor off and spool motor drive in the tape winding direction. For high inertial systems these states may be sometimes interspersed with short interval rotation of the spool in the opposite direction to that of the tape reader.

It will be realized that a simpler, but less sensitive control may be provided, using the compliance frame in accord with the invention, by using a cam operated switch having only two physical states (here positions) which only allows the spool motor to operate in the tape winding or tape unwinding state, that is, the off state for the motor is eliminated and only the two mutually reverse driving states retained.

It will further be realized that instead of step switching between spool motor drive and motor off or between spool motor on in one direction and spool motor on in the other direction, proportional control may be achieved with the frame in accord with the invention. In this event, the cam will be designed so that for operation in either direction from a central position, displacement of a sensor will be proportional to the angular deflection from the central position. This displacement will be used in accord with techniques well known to those skilled in the art to achieve proportional rotational speed of the spool motor in a compensatory sense.

Figure 9:
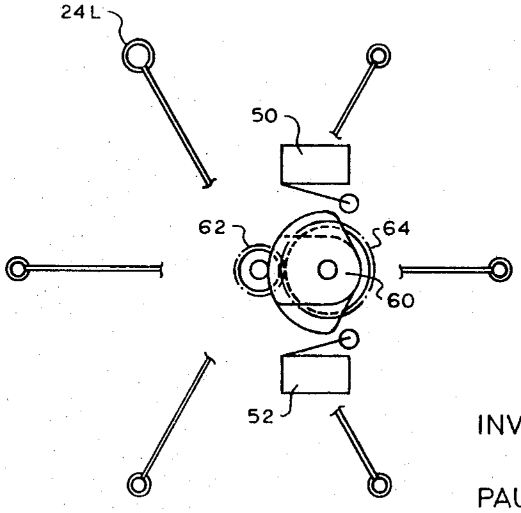
FIG. 9 shows the controls for the alternative of FIG. 8.

The above techniques and variants in the operation and spool motor control have been described for maximum rotation of the frame through less than 360°. The above operation is equally applicable where the rotation of the compliance frame is greater than 360°, such as in FIG. 8 where under the influence of the biasing spring 38 the frame has rotated about 660° in the tape unwinding direction from the position where the frame lead guide surface 24L is in line with the line from the guide post 18 to the spool axis and no tape is on the frame. This last mentioned position should be slightly beyond the permissible movement of the frame in the tape winding direction, in all forms of frame control since better control will be achieved if the frame is performing some storage function at all times, and further since a part of the frame should never be permitted to deflect the tape off the stationary guide post in the tape winding direction. Where the permissible frame arc is greater than 360° the cam surfaces are removed to separate rotary member 60 (see FIG. 9) which is coupled by gearing 62–64 (although a belt could be used) to the frame so that a rotation of the frame causes a reduced rotation of the cam carrying member. Thus in FIG. 9 where the gearing is schematically shown (and 2-1 gear reduction is assumed) 660° counterclockwise rotations of the frame 20 causes 330° of the cam carrying member 60. Thus a 600° rotation of the frame causes a 300+ rotation of the cam carrying member. Thus, with the rotation reduction used, as required to maintain the rotation of the cam carrying member 60 at less than 360° and the motor controlling microswitches are mounted for operation by the cam carrying member as before. The same criteria and control alternatives are available as with the previous embodiment, but the tape storage achievable with the inventive frame is increased.

It is noted that the frame need not supply a series of tape carrying posts. The frame may be of other forms to provide variable length tape storage along an arcuate locus outside the spool periphery, and a lead, tape guide edge around which the tape bends on the tape unwinding side. Thus FIGS. 10 and 11 shows a cylindrical surface 70 about the spool periphery about which tape may slide for varying arc lengths to the lead surface 24LA It will readily be seen that frame mounting, biasing, cam and microswitch action and previously described operating techniques are applicable.

I claim:

1. Means for providing a compliance control for tape in a system wherein a tape handling device and a spool each drive the same strip of tape at spaced locations along said tape, and where separate tape drives are provided at said tape handling device and at said spool;

the sense of rotation of said spool in which said tape is wound on said spool defining, relative to said spool, a tape winding and a tape unwinding direction;

at least one tape guide member arranged to contact and guide tape extending between said tape handling device and said spool, said tape guide member contacting tape on the tape winding side of said guide member;

a frame mounted for movements on an arcuate locus about the periphery of said spool and between said tape guide member and said periphery;

said frame defining a tape guide path approximately conforming to said arcuate locus, and spaced from tape wound on said spool;

said tape guidepath ending in a tape guide surface facing in the tape unwinding direction, said guide path and surface being designed to guide tape extending between said tape guide member over a variable extent of said path, about the tape unwinding side of said surface and onto said spool;

said frame being biased for movement along said locus in the tape unwinding direction;

switching means responsive to the angular orientation of said frame designed and arranged to assume one state in one angular orientation of said frame and another state in another angular orientation of said frame.

2. A device as claimed in claim 1 wherein the angle between said one and said another angular location is greater than 360°, means are coupled to said frame designed to rotate less than 360° during frame rotation through said angle, and wherein said switching means are responsive to the angular orientation of said coupled means.

3. A device as claimed in claim 1 wherein means are coupled to said frame designed to rotate through a proportionately smaller angle; and wherein said switching means are responsive to the angular orientation of said coupled means.

4. Means for providing storage for varying lengths of tape extending between a spool and a tape processing device where each of said spool and said processing device have separate means of propelling, the tape, and where the rotational sense of spool movement in which the tape is wound on and off said spool, defines a tape winding and a tape unwinding direction of rotation for said spool comprising:

a frame including a plurality of posts movable about an arcuate locus outside the periphery of said spool, said posts being spaced along said locus and being designed to guide tape extending between said posts while said tape is contacting the radially outward side of at least one of said posts relative to said spool; and to guide tape bent about the tape unwinding side of one of said posts and extending between contact with said radially outward side and the tape wound on said spool;

said posts being radially and arcuately located so that tape extending between adjacent ones of said posts and bearing on the radially outward side thereof will be spaced from tape wound on said spool;

means biasing said frame in the tape unwinding direction relative said spool;

and control means responsive to at least two arcuate dispositions of said frame for assuming differing physical states corresponding to said dispositions.

5. Means for providing storage for varying lengths of moving tape extending between a spool and a tape processing device where each of said spool and said processing device have separate means of propelling the tape, and where the rotational sense of movement of said spool by which the tape is wound on and off said spool, defines, respectively, a tape winding and a tape unwinding direction of rotation for said spool and for movement of said tape comprising:

a frame providing a tape guide path approximately arcuately disposed about and outside the periphery of said spool;

said tape guide path being defined on at least one surface of said frame facing radially outward;

said frame being mounted to allow said path to move arcuately about said spool;

said frame being designed to maintain tape resting thereon clear of tape wound on said spool and to provide a surface facing in the tape unwinding direction designed to support tape extending along said surface about said surface and onto said spool;

means biasing said frame in the tape unwinding direction;

whereby the orientation of said frame is determined by the amount of tape between said tape processing device and said spool;

means responsive to the orientation of said processing device for assuming physical states available for providing control signals to control the rotation of said spool.

6. A device as claimed in claim 5 wherein the means are coupled to said frame designed to rotate through a proportionately smaller angle; and wherein said switching means are responsive to the angular orientation of said coupled means.